May 14, 1957 J. R. PEGG ET AL 2,791,898
BATTERY LOCK
Filed July 29, 1955

INVENTORS
JAMES R. PEGG
LEON H. RAY
BY Ely, Pearne & Gordon
ATTORNEYS

2,791,898

BATTERY LOCK

James R. Pegg and Leon H. Ray, Chicago, Ill.

Application July 29, 1955, Serial No. 525,181

3 Claims. (Cl. 70—230)

This invention relates to a locking device for discouraging theft of car batteries.

The portability, high cost, small size and concealed location of automobile batteries make them a popular object of petty thievery, particularly in those areas where there exists a ready resale market for such items. To discourage this popular form of petty thievery, there have been provided over the years a variety of devices for locking a battery in its mounting bracket within a car. However, these devices have generally involved special battery brackets or special straps welded or riveted to the battery bracket or similar means which are difficult or expensive to install. Some of these devices have involved ingenious bolt locks but have depended on cantilever projections for retaining the battery in its bracket. Such cantilever projections, unless made from costly heavy castings, are easily bent out of the way with heavy pliers or a crowbar.

We have provided a battery lock which overcomes the above disadvantages. Our battery lock can be readily attached to standard battery mounting brackets without any modification of such standard members. In installed locked position, our device is anchored from end to end over the battery, and there is no reliance on cantilever projections to prevent removal of the battery.

We attain these objects by providing a pair of strap members or cable members, each of which is integral with and forms a gross sidewise extension from a nut member. If straps are provided, one of the strap members may be provided with transverse hinges to provide desirable flexibility. When the nut members are threaded onto the top ends of the conventional bracket-retaining vertical rods provided in most battery mounts, the ends of the strap or cable members may be locked together by a simple padlock. Since the strap members or cable members are integral with the nut members, the nut members cannot be turned and at the same time the strap or cable members together form a retainer which completely bridges the battery and is anchored at both ends.

The objects and advantages of the invention will be more fully understood from the following disclosure, by way of example, of one specific embodiment of the invention.

In the drawings, Figure 1 is a perspective view showing an example of our locking device in association with a battery provided with conventional mounting means, the battery itself being shown in phantom view.

Figure 1:
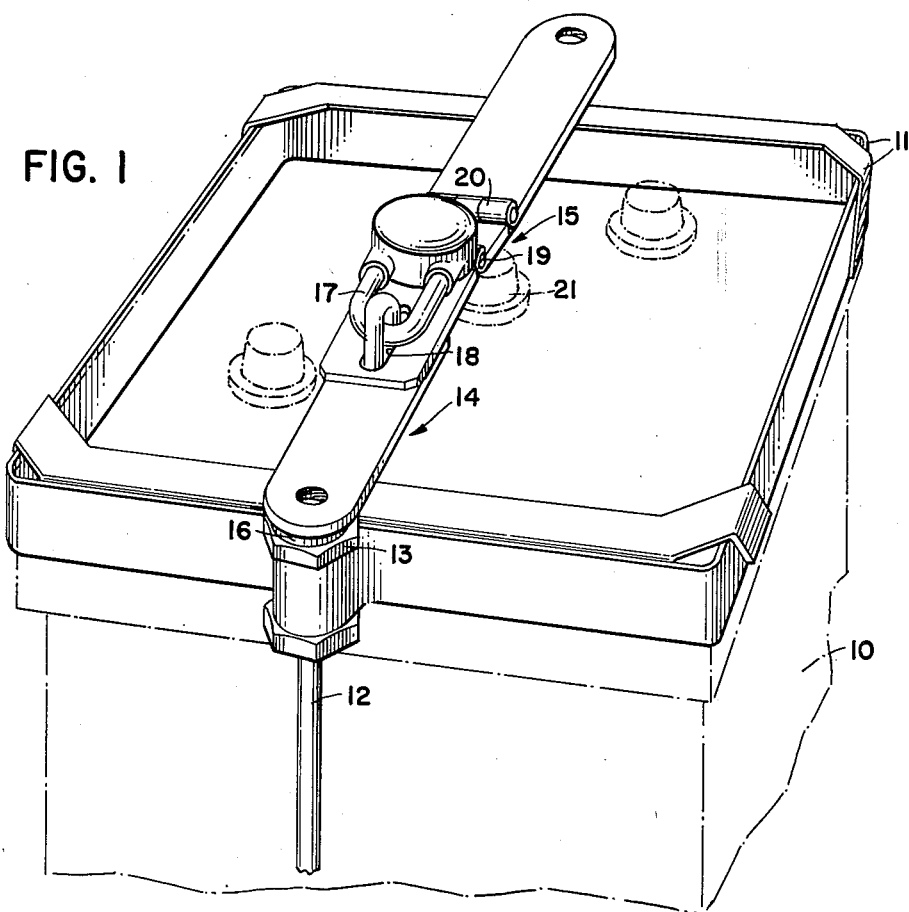

The battery 10 illustrated in Figure 1 is held down by a conventional upper battery bracket 11. The upper bracket fits over vertical tie-down rods 12, only one of which can be seen in Figure 1. The rods 12 are threaded at their upper ends to receive nuts 13 which are tightened down on the bracket 11 to firmly hold down the battery.

We provide a pair of strap members, generally indicated at 14 and 15. These members are each formed with or are welded or otherwise fixed to a nut 16, the tapped bore of the nuts preferably extending through the member 14 and 15, as clearly indicated in Figures 2 and 3. It will be seen that the strap members 14 and 15 constitute gross sidewise extensions of the nuts 16. One of the members 14 or 15 is provided at the end remote to the nut 16 with a hasp staple 17, and the other of the strap members 14 or 15 is provided at such end with a hasp eye 18.

One of the strap members 14 or 15 is preferably transversely hinged at one or more points 19 and 20 to provide a certain degree of flexibility and to allow the central portion of the device to be folded out of the way when central battery caps, such as the cap 21, are to be opened.

Assuming that the conventional upper battery bracket is already in place and tightened down, the device is used as follows. Without disturbing the conventional bracket installation in any manner, the nuts 16 are tightened down on the upper threaded ends of the tie-down rods 12, the nuts being given a final rotational position such that the strap sections 14 and 15 are aligned. The hasp eye 18 is then lowered over the hasp staple 17, and the hasp is locked with a lock 22, illustrated as a padlock. It will be seen that the assembled and locked device is anchored at both ends by the nuts 16 which, of course, cannot be backed off while the device is locked. Accordingly, the device cannot be simply bent or pried out of the way, even though it comprises relatively light strap material. The device must be either sawed or cut or broken under tension by great leverage, all of which require that kind of equipment or notorious effort that serves to dissuade petty thievery.

Figure 2:
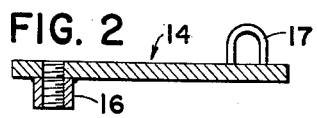
Figures 2 and 3 are longitudinal sectional views of different parts of the locking device shown in Figure 1.
Figure 3:
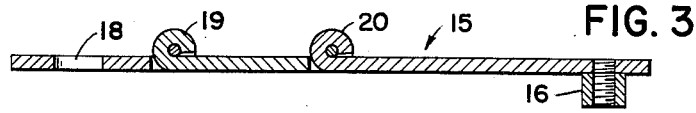
Figures 4, 5:
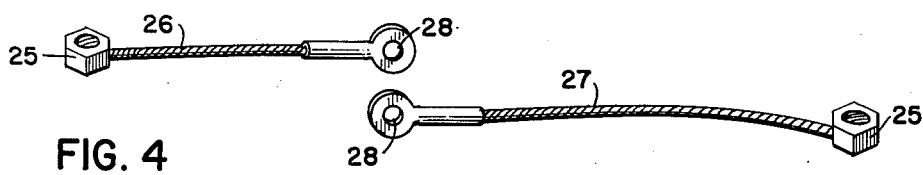
Figures 4 and 5 are views of the two parts of an alternative embodiment of the invention.

The device shown in Figures 4 and 5 is similar in principle to that shown in Figures 1–3. A pair of nuts 25 are provided which are equivalent to the nuts 16. Welded to the nuts and extending sidewise therefrom are flexible members 26 and 27, preferably flexible steel cables. Eyes 28 or similar fittings are swaged or otherwise secured to the ends of the cables 26 and 27 opposite to the nuts 25.

It will be immediately understood that the use of this embodiment is similar to that of the embodiment shown in Figures 1–3. The nuts 25 are threaded on the ends of the vertical tie-down rods 12 and are tightened down, being finally rotatively positioned so that the cables 26 and 27, when extended radially, are in aligned position. The proportions of the parts, particularly the lengths of the swaged fittings and the cables 26 and 27, are preferably such that in such aligned position the eyes 28 can be extended into alignment and no further. When the eyes 28 are aligned, a padlock is passed through them and locked. Once again, it will be noted that mere bending or prying aside will not suffice to remove the battery being secured, and while it is not impossible to break the device, the notorious or prolonged effort and tools required to do this without damaging the battery effectively serve to prevent petty thievery.

The above disclosures of two embodiments of the invention should make it clear that the scope of the invention cannot fairly be limited in all respects to the precise and special details of the illustrated examples. Still other variations will be suggested by the above disclosure. For example, one of the nuts 25 could be provided on one side with a heavy eyed member, and the other nut could be provided with a cable of a dimension to extend all of the way across the battery, the eye on the end of this long cable being alignable with the eye in the eyed member fixed to the one nut 25. The following claims are intended to define the scope of the invention.

What is claimed is:

1. In a batttery locking device, a pair of tapped nuts, a gross side-wise extension integral with and extending from each of said nuts, at least one of said extensions being flexible in at least one plane, said extensions each including means forming an eye, at least one of said eyes being located remotely from its associated nut, whereby, when said nuts are threaded on studs in such rotative position as to align said extensions, and a padlock and said several means are interengaged and locked, said nuts cannot be turned off said studs, and a bridge is formed therebetween.

2. In a battery locking device, a pair of tapped nuts, a gross side-wise extension integral with and extending from each of said nuts, at least one of said extensions comprising a flexible metal cable, said extensions each including means forming an eye, the eye associated with said at least one cable being located remotely from its associated nut, whereby, when said nuts are threaded on studs in such rotative positions as to align said extensions, and a padlock and said several means are interengaged and locked, said nuts cannot be turned off said studs, and a bridge is formed therebetween.

3. In a battery locking device, a pair of tapped nuts, a strap integral with and extending radially from each of straps, the ends of each of said straps remote to its associated nut including means forming an eye, whereby, when said nuts are threaded on studs in such rotative position as to align said straps, and a padlock and said several eye-forming means are interengaged and locked, said nuts cannot be turned off said studs, and a bridge is formed therebetween.

References Cited in the file of this patent

UNITED STATES PATENTS

| | | |
|---|---|---|
| 1,208,236 | Thompson | Dec. 12, 1916 |
| 1,577,292 | Obreiter | Mar. 16, 1926 |

FOREIGN PATENTS

| | | |
|---|---|---|
| 656,880 | France | May 14, 1929 |